United States Patent Office 3,484,431
Patented Dec. 16, 1969

3,484,431
METALLIZED REACTIVE NAPHTHOLAZO NAPHTHOL DYESTUFFS CONTAINING A POLYHALOGENATED PYRIMIDINE GROUP
Lukas Schneider, Basel, Switzerland, assignor to Sandoz Ltd. (also known as Sandoz A.G.), Basel, Switzerland
No Drawing. Continuation-in-part of application Ser. No. 82,685, Jan. 16, 1961. This application July 15, 1963, Ser. No. 295,186
Claims priority, application Switzerland, Jan. 29, 1960, 984/60; Mar. 30, 1960, 3,580/60
Int. Cl. C09b 45/18
U.S. Cl. 260—146  4 Claims This application is a continuation-in-part of my application Ser. No. 82,685, filed Jan. 16, 1961, and now abandoned and relates to new reactive monoazo dyestuffs of the formula

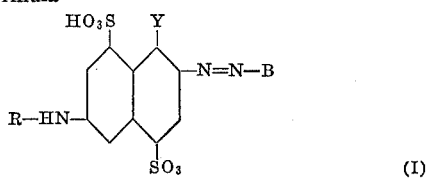

wherein
B represents the radical of a hydroxynaphthalene or 1-aryl-5-pyrazolone which is coupled in a position vicinal to the hydroxy group, bears at least one sulfonic acid group and may contain other substituents,
Y represents hydrogen or —O—Cu—, the copper atom being linked to the hydroxy group of the radical B in the position vicinal to —N=N and R—NH— represents a group of the formula

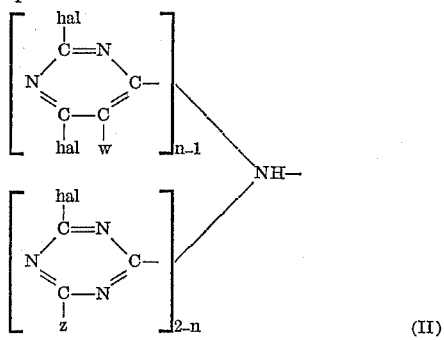

hal being a halogen atom with an atomic number between 16 and 36, i.e. being chlorine or bromine,
w being hydrogen, chlorine, bromine, methyl, ethyl, carboxy or carboxymethyl,
z being chlorine, bromine, amino, lower alkylamino, di-(lower alkyl)-amino, lower hydroxyalkylamino, di-(lower hydroxyalkyl)-amino, lower alkoxyalkylamino, lower carboxyalkylamino, N-lower alkyl-N-lower carboxyalkylamino, lower sulfoalkylamino, N-lower alkyl-N-lower sulfoalkylamino, phenylamino, N-lower alkyl-N-phenylamino, N-lower hydroxyalkyl-N-phenylamino, lower alkylphenylamino, chlorophenylamino, lower alkoxyphenylamino, carboxyphenylamino sulfophenylamino, disulfophenylamino, sulfonaphthylamino, disulfonaphthylamino, cyclohexylamino, methylcyclohexylamino, benzylamino, phenoxy or lower alkoxy,
and n being one of the integers 1 and 2.

Particularly interesting dyestuffs correspond to the formulae

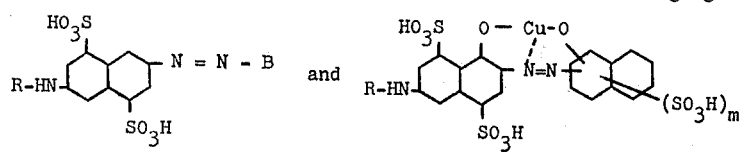

wherein
B has the afore-cited meaning,
m is one of the integers 1, 2 and 3 and R—HN— corresponds to the Formula II
in which w represents hydrogen, chlorine, or bromine, when n is 2, and those in which z represents amino, methylamino, 2′-hydroxyethylamino, 2′-sulfoethylamino, 3′- or 4′-sulfophenylamino, methoxy or chlorine when n is 1, and the copper complex dyestuff contains preferably a total of 4 to 5 sulfonic acid groups.

The process for their production consists in coupling 1 mol of the diazo compound of an amine of the formula

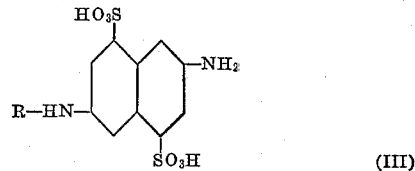

wherein R has the afore-cited meaning,
with 1 mol of a hydroxynaphthalene or 1-aryl-5-pyrazolone bearing at least one sulfonic acid group and coupling in a position vicinal to the enolic or phenolic hydroxy group, the dyestuff so formed then being treated if desired with an oxidizing agent in presence of a copper-yielding agent.

A second mode of operation of the process consists in coupling 1 mol of the diazo compound of an amine of the formula

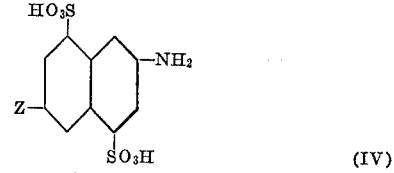

wherein Z represents a substituent which is readily convertible into an amino group,
with 1 mol of a hydroxynaphthalene or 1-aryl-5-pyrazolone bearing at least one sulfonic acid group and coupling in a position vicinal to the enolic or phenolic hydroxy group, converting the substituent Z in the product into an amino group, condensing the resulting intermediate product with 1 mol of a polyhalogeno-triazine of the formula

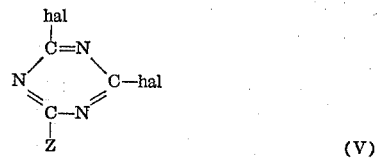

or a polyhalogeno-pyrimidine of the formula

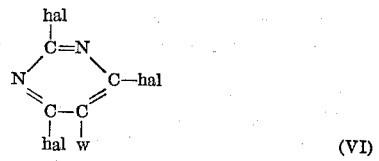

wherein hal, z and w have the above-cited meanings, and, if desired, treating the dyestuff so formed with an oxidizing agent in presence of a copper-yielding agent.

The following procedures can be adopted for producing the dyestuffs of the invention:

(a) 1 mol of 2,6-diamononaphthalene-4,8-disulfonic acid is condensed with 1 mol of a compound of Formula V or VI, the intermediate thus obtained is diazotized and the diazo compound is coupled with a hydroxynaphthalene or 1-aryl-5-pyrazolone bearing at least one sulfonic acid group and coupling in a position vicinal to the phenolic or enolic group and optionally the monoazo dyestuff is simultaneously oxidized and coppered;

(b) 1 mol of 2-diazonaphthalene-4.8-disulfonic acid containing in the position 6 a substituent convertible into an amino group is coupled with a hydroxynaphthalene or 1-aryl-5-pyrazolone bearing at least one sulfonic acid group and coupling in a position vicinal to the phenolic or enolic group and the substituent in the position 6 of the resulting monoazo dyestuff is converted into the amino group, this amino group is condensed with a compound of Formula V or VI and optionally the monoazo dyestuff is simultaneously oxidized and coppered;

(c) 1 mol of 2-diazonaphthalene-4.8-disulfonic acid containing in the position 6 an acylamino group is coupled with a hydroxynaphthalene or 1-aryl-5-pyrazolone bearing at least one sulfonic acid group and coupling in a position vicinal to the phenolic or enolic group, the monoazo dyestuff is simultaneously oxidized and coppered, the acylamino group converted into the amino group by alkaline saponification, the copper complex meanwhile remaining intact, and the aminoazo dyestuff obtained condensed with a compound of Formula V or VI.

The compounds of Formula V are e.g. cyanuric chloride, cyanuric bromide, primary condensation products of a cyanuric halide of the composition

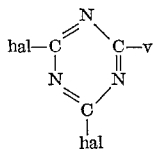

wherein hal represents chlorine or bromine, and $v$ the radical, which may be further substituted, of a primary or secondary aliphatic, alicyclic, aromatic or heterocyclic amine, an aliphatic, alicyclic, aromatic or heterocyclic hydroxy- or thiol compound, in particular the radical of aniline, its alkyl and sulfonic acid or carboxylic acid derivatives, low molecular monoalkyl- or dialkyl-amines optionally substituted by OH or $SO_3H$ groups or the radical of ammonia.

Among the compounds of Formula VI the following may be mentioned: 2.4.6-trichloro- or 2.4.6-tribromopyrimidine, 2.4.6-trichloro- or 2.4.6-tribromo-5-methyl-, -5-ethyl-, -5-carboxy- or -5-carboxymethyl-pyrimidine, 2,4,6-trichloro-5-bromopyrimidine, 2.4.5.6-tetrachloro- or 2.4.5.6-tetrabromopyrimidine.

The introduction of a cyanuric radical is best carried out in an aqueous medium at about 0° C. ad at weakly acid reaction, e.g. at a pH value of 3 to 5. Cyanuric halide is used as such in solid form or in solution in an organic solvent, e.g. acetone. In the case of the primary condensation products of a cyanuric halide it is best to choose a temperature of 30° to 60° C. and a pH value of 4 to 6, while for the di-, tri- and tetrahalogenopyrimidines temperatures between 40° and 100° C. and pH-values from 3 to 7 are most suitable.

The introduction of a monohalogeno-1.3.5-triazinyl radical can also be carried out indirectly by condensing first the amino-monoazo dyestuff with a cyanuric halide and then reacting the obtained 4.6-dihalogeno-1.3.5-triazinyl-2-amino-monoazo dyestuff with ammonia, a primary or secondary amine.

The diazotization of the amines of Formula III or IV is carried out by the direct or, preferably, the indirect method at temperatures of e.g. 0° to 5° C. The coupling reaction is conducted in a weakly acid, neutral or alkaline medium, preferably at pH 6 to 10, and at low temperatures, e.g. 5° to 10° C.

Examples of coupling components B-H which are suitable for the process are: e.g. 1-phenyl-3-methyl-5-pyrazolone-2′.5′-disulfonic acid, 1-phenyl-3-methyl-5-pyrazolone-2′,4′-disulfonic acid, 1-(2′.5′-dichloro)-phenyl-3-methyl-5-pyrazolone-4′-sulfonic acid, 1-phenyl-3-methyl-5-pyrazolone-4′-sulfonic acid, 1-phenyl-3-methyl-5-pyrazolone-3′-sulfonic acid, 1-(2′-chloro)-phenyl-3-methyl-5-pyrazolone-4′- or -5′-sulfonic acid, 1-phenyl-3-carboxy-5-pyrazolone-3′- or 4′-sulfonic acid, hydroxynaphthalenesulfonic acids, such as 1-hydroxynaphthalene-4- or -5-sulfonic acid, 2-hydroxynaphthalene-4-, -5-, -6-, -7- or -8-sulfonic acid, 1-hydroxynaphthalene-3,6-, -3,8-, -4,7- or -4,8-disulfonic acid, 2-hydroxynaphthalene-3,6- or -6,8-disulfonic acid, 1-hydroxy- and 2-hydroxynaphthalene-3.6.8-trisulfonic acid and their mixtures, N-substituted 2-amino- or 3-amino-5-hydroxynaphthalene-7-sulfonic acid or N-substituted 1-amino-8-hydroxynaphthalene-3,6- or -4,6-disulfonic acid e.g. 1-acetylamino-8-hydroxynaphthalene-3,6- or -4,6-disulfonic acid, 1-chloroacetyl-amino- or 1-β-chloropropionylamino-8-hydroxynaphthalene-3,6- or -4,6-disulfonic acid, 1-(4′,6′-dichloro-1′,3′,5′-triazinyl-2′)-amino-8-hydroxynaphthalene-3,6- or -4,6-disulfonic acid, 2-(4′-phenylamino-6′-chloro1′.3′.5′-triazinyl-2′)-amino-5-hydroxynaphthalene-7,4″-disulfonic acid, 2-chloroacetylamino-8-hydroxynaphthalene-6-sulfonic acid, etc.

The diazo components employed in the second mode of operation of the process, namely 2-amino-6-nitro- or -6-acylamino- (e.g. -6-acetylamino-, -6-benzoylamino-, -6-oxalylamino- or -6-carbethoxyamino)-naphthalene-4.8-disulfonic acids, are diazotized in the same way, and the diazo compound coupled with a coupling component conforming to the invention in the same way as in the case of the monocondensation products of a 2,6-diaminonaphthalene-4,8-disulfonic acid and a reactive compound of the Formula V or VI.

Subsequently the nitro group is reduced, e.g. by treatment with an aqueous solution of sodium sulfide or sodium hydrogensulfide, preferably at 60° to 90° C., or the acylamino group is hydrolyzed, e.g. by dissolving the product in 10 to 20 times its amount of concentrated sulfuric acid and diluting with water to a sulfuric acid concentration of about 80% so that the temperature increases to about 100° C., or by heating in an aqueous solution of alkali-metal hydroxides, preferably in a 5% to 10% solution of sodium or potassium hydroxide at 70–100° C.

The aminoazo compound thus obtained is condensed with a reactive compound of the Formula V or VI as described in the foregoing. On completion of condensation or coupling the solution or suspension may be neutralized with sodium or potassium chloride if desired and the final reactive dyestuff is then salted out or precipitated with acid and subsequently filtered with suction, washed and dried.

In cases where the oxidizing-coppering treatment is carried out the process of British Patents 660,447 and 721,495 may be adopted, but the preferred process is that described in Examples 1 and 4 to 10 of British Patent 660,447 using a water-soluble copper salt and hydrogen peroxide at temperatures ranging from 20 to 80° C.

The copper complex dyestuffs are precipitated from their solutions by salts (sodium chloride, potassium chloride etc.); they are then filtered off, washed if desired and dried.

The new reactive monoazo dyestuffs as well as the copper-containing reactive monoazo dyestuffs obtained from them by simultaneous oxidation and coppering bear three to five sulfonic acid groups and possess therefore good solubility in water, good stability in printing pastes and padding liquors, good compatibility with salts and hard water, good reactivity with vegetable fibers, e.g.

cotton and linen; regenerated cellulose, e.g. viscose filament fibers, viscose staple fibers, cuprammonium rayon, animal fibers, such as wool and silk and synthetic polyamide fibers such as nylon 66, nylon 6 and nylon 11; they are practically insensitive to heavy metal ions such as copper, iron and chromium ions and reserve cellulose-2½- and triacetate, polyester fibers such as polyethylene terephthalate, polyvinyl chloride and polyvinyl acetate fibers, polyacrylonitrile fibers and polyalkylene fibers such as polyethylene and polypropylene fibers.

The new dyestuffs are suitable for dyeing leather; for dyeing, padding and printing wool and silk, synthetic polyamide fibers, fibers of natural and regenerated cellulose and blends of these fibers. The commonly used padding and printing techniques can be applied, e.g. the padding processes Pad Jig, Pad Steam, Pad Roll, Pad Batch and thermofixation process, and the printing processes named roller printing, screen printing, emulsion printing and Vigoureux printing; in these printing processes the dyestuffs are fixed on the substrate by steaming or thermofixation.

The optimum conditions of application vary with the fiber to be dyed and the dyestuffs used. Animal fibers and synthetic polyamide fibers are best dyed or printed or fixed in acid, neutral or weakly alkaline medium, e.g. in presence of acetic acid, formic acid, sulfuric acid, ammonium sulfate, sodium metaphosphate etc. The dyestuffs can also be applied from an acetic acid to neutral bath in presence of levelling agents, e.g. polyoxyethylated fatty amines or mixtures of these and alkylpolyglycol ethers, in which case the bath is made neutral or weakly alkaline at the end of the dyeing process by the addition of small amounts of an agent of alkaline reaction, e.g. ammonia, sodium bicarbonate etc. or compounds which react alkaline on heating, e.g. hexamethylene-tetramine or urea. Subsequently the goods are thoroughly rinsed and, if necessary, soured with a little acetic acid.

The dyeing, padding and printing or fixation of the dyestuffs on cellulosic fibers are carried out advantageously in alkaline medium, e.g. in presence of sodium carbonate or bicarbonate, sodium hydroxide solution, potassium hydroxide solution, sodium metasilicate, sodium borate, trisodium phosphate, ammonia etc. To preclude reduction effects in dyeing, padding and printing, it is often advantageous to add a mild oxidizing agent, e.g. sodium 1-nitrobenzene-3-sulfonate. Dyeings and prints of the dyestuffs on cellulosic fibers are normally fixed by heat treatments. The dyestuffs can also be fixed at low temperatures, e.g. 20° to 40° C., e.g. with an alkali metal carbonate or bicarbonate (sodium or potassium carbonate or bicarbonate) in the case of the dyestuffs bearing a 4.6-dihalogeno-1.3.5-triazinyl-2 group, or with strong alkalis such as sodium or potassium hydroxide, sodium metasilicate or trisodium phosphate, in the case of the dyestuffs bearing a monohalogeno-1.3.5-triazinyl, a dihalogeno- or trihalgenopyrimidyl group.

In dyeing, padding and printing applications the dyestuffs can be fixed simultaneously and subsequently, in the same or in a fresh bath, if necessary after intermediate drying. When fixation is carried out in a fresh bath it is advisable to include in it a water-soluble salt, e.g. sodium sulfate, to preclude a partial redissolving of the dyestuff in the liquor. After fixation the portion of unreacted dyestuff, i.e. the dyestuff which has not taken part in the chemical reaction with the fiber, must be removed from the dyed or printed material. Owing to the very slight substantivity and the good solubility in water of the new dyestuffs this removal is in general easy and can often be carried out by rinsing with hot water, whereby in case of prints no staining of the unprinted areas appears. Washing at higher temperatures with solutions of soap or of synthetic detergents, e.g. alkylarylsulfonates such as sodium dodecylbenzenesulfonate, alkyl sulfates such as sodium dodecyl, oleyl or cetyl sulfate, optionally sulfated or carboxymethylated alkylpolyglycol, mono- or dialkylphenylpolyglycol ethers, although it is seldom necessary, is nevertheless generally employed in routine padding and printing processes in order to obtain perfect prints and dyeings.

The dyeings and prints on cellulosic fibers possess excellent fastness to water, sea water, washing, acid and alkaline perspiration, crocking, ironing and organic solvents (alcohols, ketones, esters, aromatic and aliphatic hydrocarbons which may be halogenated, pyridine and 1:1-pyridine-water-mixture, dimethylformamide, dimethsulfoxide, etc.), these excellent fastness properties being due to the stable chemical linkage formed between the dyestuff molecule and the cellulose molecule. In addition the dyeings and prints are also very fast to acids (cold dilute acetic and tartaric acid), alkali (sodium bicarbonate and carbonate) and peroxides. They further possess good fastness to light, gas fumes and chlorinated swimming pool water and are suitable for anticrease finishing treatments.

The dyeings and prints on wool, silk and synthetic polyamide fibers possess a good fastness to light and excellent fastness properties to washing, water, sea water, milling, acid and alkaline perspiration, crocking, pressing and organic solvents; they are also stable against chlorinated swimming pool water, peroxides, acids (dilute acetic and tartaric acid in the cold), alkali (sodium carbonate and bicarbonate) and gas fumes.

In the following examples the parts and percentages are by weight and the temperatures in degrees centigrade.

EXAMPLE 1

31.8 parts of 2.6 - diaminonaphthalene-4.8 disulfonic acid are dissolved in 300 parts of water with the addition of 27 parts of 30% sodium hydroxide solution. 19 parts of 2.4.6-trichloro-pyrimidine dissolved in 20 parts of acetone are then added and the mass is maintained at a temperature of 40–50° for 4 hours with stirring and under reflux. The reaction product formed is precipitated in crystalline form. After cooling to 10–12°, 40 parts of 30% hydrochloric acid are added so that a mineral acid reaction ensues, and a solution of 7 parts of sodium nitrite in 30 parts of water is added dropwise for diazotization. The resulting suspension of the diazo compound is run into an ice-cold solution of 35 parts of 1-phenyl-3-methyl-5-pyrazolone-2′.4′-disulfonic acid and 50 parts of sodium carbonate in 400 parts of water in the course of about 30 minutes.

The monoazo dyestuff formed is precipitated with the aid of sodium chloride, filtered off and dried. A red powder is obtained, which dissolves in water with a yellow-red coloration and dyes cotton and fibers of regenerated cellulose in yellow-orange shades of excellent washing fastness.

A padding solution is prepared with 10 parts of the above dyestuff in 1000 parts of water and 10 parts of sodium carbonate. A cotton fabric is impregnated with this solution, passed between squeeze rollers so that it contains about 70% of its weight of liquor, and dried.

The padded goods are treated in dry heat for about 5 minutes at 150°, rinsed with cold and warm water, soaped at the boil for 15 minutes with a 0.05–0.1% solution of a non-ionic detergent and rinsed. A brilliant yellowish orange dyeing is obtained, which is fixed so stably as to be fast to boiling and to the other wet treatments and is stable to crease-resistant finishes.

A similar dyestuff is obtained when the 19 parts of 2.4.6-trichloro-pyrimidine in the above example are replaced by 32 parts of 2.4.6-tribromopyrimidine.

EXAMPLE 2

The aqueous suspension of the diazo compound of 36 parts of 2-amino-6-acetylaminonaphthalene-4.8-disulfonic acid, prepared in the normal way, is run in the course of 30 minutes into an ice-cold solution of 35 parts of 1-phenyl-3-methyl-5-pyrazolone-2′.5′-disulfonic acid and 50 parts of sodium carbonate in 400 parts of water. The monoazo dyestuff formed is precipitated with common salt and filtered off. The filter residue is dissolved in 250 parts of water at 75–80°, and 100 parts of 30% sodium hydroxide solution are added. The mass is maintained at 75–80° for about 30 minutes with stirring, whereupon the saponification of the acetylamino group is complete. On cooling, about 80 parts of 30% hydrochloric acid are dropped in to bring the pH value of the solution to 4–5. After the addition of about 22 parts of 2.4.5.6-tetrachloropyrimidine the mass is stirred for 4 hours at 60–65°. By dropping in diluted sodium carbonate solution a constant pH value of between 4 and 5 is maintained. On completion of the reaction the solution is treated with blood charcoal. After filtration, the dyestuff is precipitated from the solution by the addition of sodium chloride, filtered with suction, and the presscake washed with sodium chloride solution and dried. The ground dyestuff is a red powder which dissolves in water with a yellow-red coloration.

A mercerized cotton fabric is printed with a printing paste of the following composition:

| | |
|---|---|
| Parts of the above dyestuff | 30 |
| Parts of urea | 100 |
| Parts of water | 395 |
| Parts of 4% sodium alginate thickening | 450 |
| Parts of sodium 1-nitrobenzene-3-sulfonate | 10 |
| Parts of sodium carbonate | 15 |
| | 1000 |

The print is dried and fixed by steaming for 10 minutes. It is then rinsed in the normal way with cold and hot water, if necessary soaped at the boil, and rinsed again with hot water and cold water. On drying a brilliant yellow-orange print is obtained which has excellent fastness to wet treatments and is stable to crease-resistant finishes.

The corresponding dyestuffs obtained by condensation with 40 parts of 2.4.5.6-tetrabromopyrimidine or 26.5 parts of 5-bromo-2.4.6-trichloropyrimidine possess similar properties.

EXAMPLE 3

An aqueous suspension of the diazo compound of 35 parts of 2-amino-6-nitronaphthalene-4.8-disulfonic acid is slowly run into a mixture, cooled to 10°, of 35 parts of 1-phenyl-3-methyl-5-pyrazolone-2'.5'-disulfonic acid and 50 parts of sodium carbonate in 400 parts of water. On completion of coupling the mass is heated to 80°, a solution of 40 parts of crystallized sodium sulfide in 100 parts of water added, and the temperature maintained at 80° for 40 minutes. When the nitro group has been completely reduced the reaction mixture is allowed to cool, and then neutralised with concentrated hydrochloric acid to a pH value of 7. The aminoazo dyestuff is then salted out with sodium chloride. After some time the precipitate is filtered off and washed with concentrated sodium chloride solution. The filter residue is then dissolved in 900 parts of water. This solution is slowly run into a suspension of 18 parts of cyanuric chloride in 300 parts of ice and 200 parts of water at 0–5°, while a constant weakly acid reaction of the reaction mixture is maintained by the dropwise addition of diluted sodium carbonate solution. On completion of reaction the dyestuff is salted out with sodium chloride and filtered off. The filter residue is dried with vacuum at room temperature. An orange-colored powder is obtained, which dissolves in water with an orange-red coloration.

When the 18 parts of cyanuric chloride are replaced by 32 parts of cyanuric bromide, a similar dyestuff is obtained. A padding solution is prepared with 10 parts of the above dyestuff in 1000 parts of water and to it are added immediately before use 10 parts of sodium carbonate at room temperature. A cotton fabric is impregnated with this solution, passed between squeeze rollers so that it contains about 70% of its weight of liquor, rolled up on a roller, and wrapped in rubber or plastic sheets to prevent drying. After 3½ hours' storage at room temperature the goods are rinsed in cold and warm water, soaped at the boil for 15 minutes in a 0.05–0.1% solution of a non-ionic detergent and rinsed. An orange dyeing is obtained, which is fixed so stably as to be fast to boiling and to the other wet treatments and is stable to crease-resistant finishes.

EXAMPLE 4

75.1 parts of sodium 1-phenyl-3-methyl-4-(6''-amino-naphthyl-2''-azo) - 5 - pyrazolone - 2',5',4'',8''-tetrasulfonate—obtained according to the particulars of Example 3—are dissolved in 900 parts of water and the pH value is adjusted to 5. After the addition of 34.3 parts of sodium 2-phenylamino-4.6-dichloro-1.3.5-triazine - 3' - sulfonate the temperature is raised to 40° and maintained at 40–45° and the pH value between 4 and 6 by the addition of dilute sodium carbonate solution. On completion of reaction the dyestuff is salted out with sodium chloride and filtered off. The filter cake is dried with vacuum at 40°. An orange powder is obtained which dissolves in water with an orange-red coloration.

EXAMPLE 5

The condensation product obtained from 71.5 parts of sodium 1 - phenyl-3-methyl-4-(6''-aminonaphthyl-2''-azo-5-pyrazolone-2',5',4'',8''-tetrasulfonate and 18 parts of cyanuric chloride according to the particulars of Example 3 is dissolved in warm water and adjusted to about 1000 parts and a temperature of 40°. To the well stirred neutral solution 9.3 parts of aminobenzene are added dropwise and the temperature is maintained at 40–50° and the pH-value at about 5 by the addition of a 20% sodium carbonate solution. When no further alkali is consumed the formed dyestuff is precipitated by the addition of sodium chloride, filtered off with suction, dried and ground to give a yellow powder which dissolves in water with a yellow coloration and dyes cotton and wool in yellow shades fast to light and to wet treatments.

Similarly on condensing 79.5 parts of the dyestuff sodium 1 - phenyl - 3-methyl-4-[6'' - (4''',6'''-dichloro-1''', 3''',5'''-triazinyl - 2''' - amino)-naphthyl-2''-azo]-5-pyrazolone-3'.4''.8''-trisulfonate with 17.3 parts of 3-aminobenzene-1-sulfonic acid in aqueous medium at 35–45° and at a pH value between 4.5 and 5.0, a yellow dyestuff is obtained which dyes wool and cotton in reddish yellow shades fast to light and to wet treatments.

2 parts of the above dystuff, 0.8 part of an oxethylated fatty amine and 0.5 part of an oleypolyglycol ether are dissolved in 5000 parts of water. After the addition of 2 parts of glacial acetic acid the dyebath is heated to 40–50° and 100 parts of prewetted wool are entered. The dyebath is then brought to the boil in 30 minutes and held at the boil for 45 minutes. Then the dyed wool material is removed, rinsed and dried. A level reddish yellow dying fast to wet treatments is obtained.

EXAMPLE 6

41.7 parts of the monosodium salt of 2-amino-6-(4',6'-dichloro-1'.3'.5'-triazinyl - 2' - amino)-naphthalene-4.8-disulfonic acid — obtained by mono condensing 2,6-diaminonaphthalene-4,8-disulfonic acid with cyanuric chloride at 0–5° and at a pH-value of 4–4.5 and isolating from acid medium—are suspended in 400 parts of water and 40 parts of 30% hydrochloric acid. After cooling to 10° a solution of 7 parts sodium nitrite is added dropwise. When the diazotization is completed the diazo suspension is neutralized to Congo at 5–10° with 20% sodium carbonate solution and then run slowly into an ice cold solution of 35 parts of sodium 2-hydroxy-naphthalene-3,6-disulfonate in 400 parts of water, a 20% sodium carbonate solution being added to neutralize the acid formed during the reaction. After the addition of the diazo suspension the coupling mass is made alkaline with sodium carbonate solution and maintained alkaline until the dyestuff formation at 8–12° is completed. The dyestuff is precipitated with sodium chloride, filtered off, dried in vacuum at 30° and gorund. It is a red-brown powder which dissolves in water with a red coloration and dyes cotton in red shades fast to light and to wet treatments.

EXAMPLE 7

When the monocondensation product used in Example 6 is replaced by 63.2 parts of the disodium salt of 2-amino-6-(4'-phenylamino - 6' - chloro - 1',3',5'-triazinyl-2'-amino)-naphthalene-4,8,4" - trisulfonic acid—obtained by monocondensing 2,6-diaminonaphthalene-4,8-disulfonic acid with 2-phenylamino-4,6-dichloro-1,3,5-triazine - 4' - sulfonic acid at about 40° and at a pH-value of about 5 and isolating the condensation product from acid medium—and the diazo compound is coupled with sodium 1-hydroxynaphthalene-3.8-disulfonic acid, a dyestuff with excellent fastness properties is obtained.

Mercerized cotton fabric is printed with a printing paste of the composition

| | |
|---|---|
| Parts of the above described dyestuff | 30 |
| Parts of urea | 100 |
| Parts of potassium carbonate | 20 |
| Parts of 30% sodium hydroxide solution | 2 |
| Parts of sodium 3-nitrobenzene-1-sulfonate | 10 |
| Parts of 2.5% sodium alginate thickening | 450 |
| Parts of water | 388 |
| Parts total | 1000 |

The print is dried, steamed for 10 minutes at 102°, rinsed with cold and with hot water, soaped for 15 minutes at the boil with a 0.1% soap solution in distilled water, rinsed again and dried. The obtained red print is fast to light and to wet treatments and the unprinted areas are perfectly white.

In the following table are listed a number of further dystuffs which were produced according to the invention and have the formula

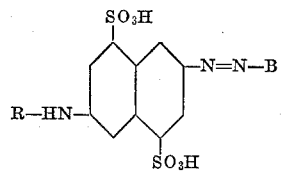

In the table they are characterized by the symbols R and B, the method of production according to Examples 1 to 7 and by the shade of the dyeing on cotton or wool in the columns (I) to (IV).

| Example No. | R = Radical of (I) | B = Radical of (II) | (III)[1] | Shade of dyeing on cotton or wool (IV) |
|---|---|---|---|---|
| 8 | 2.4.5.6-tetra-chloropyrimidine | 1-phenyl-3-methyl-5-pyrazolone-2'.4'-disulfonic acid | 2 | Reddish yellow. |
| 9 | do | 1-phenyl-3-methyl-5-pyrazolone-3'.5'-disulfonic acid | 2 | Do. |
| 10 | do | 1-phenyl-3-methyl-5-pyrazolone-4'-sulfonic acid | 2 | Do. |
| 11 | do | 1-(2'.5'-dichloro)-phenyl-3-methyl-5-pyrazolone-4-sulfonic acid | 2 | Do. |
| 12 | do | 1-hydroxynaphthalene-3.6-disulfonic acid | 1 | Red. |
| 13 | do | 1-hydroxynaphthalene-4.6-disulfonic acid | 2 | Red. |
| 14 | 5-bromo-2.4.6-trichloropyrimidine | 1-hydroxy-8-acetylamino-naphthalene-3.6-disulfonic acid | 2 | Red. |
| 15 | 2.4.5.6-tetrachloropyrimidine | 1-hydroxy-8-chloroacetylaminonaphthalene-3.6-disulfonic acid | 2 | Red. |
| 16 | do | 2-hydroxynaphthalene-3.6-disulfonic acid | 2 | Red. |
| 17 | do | 2-hydroxynaphthalene-6.8-disulfonic acid | 2 | Red. |
| 18 | 2.4.6-trichloropyrimidine | 1-phenyl-3-methyl-5-pyrazolone-2'.5'-disulfonic acid | 2 | Reddish yellow. |
| 19 | do | 1-phenyl-3-methyl-5-pyrazolone-3'-sulfonic acid | 1 | Do. |
| 20 | Cyanuric-chloride | 1-phenyl-3-methyl-5-pyrazolone-4'-sulfonic acid | 3 | Do. |
| 21 | do | 1-phenyl-3-methyl-5-pyrazolone-3'-sulfonic acid | 3 | Do. |
| 22 | do | 1-hydroxynaphthalene-3.6-disulfonic acid | 3 | Red. |
| 23 | 2.4.6-trichloro-5-carboxy-pyrimidine | 1-phenyl-3-methyl-5-pyrazolone-2'.4'-disulfonic acid | 2 | Reddish yellow. |
| 24 | 2.4.6-trichloro-5-methyl-pyrimidine | do | 2 | Do. |
| 25 | do | 2-hydroxynaphthalene-3.6-disulfonic acid | 2 | Red. |
| 26 | 2.4.5.6-tetrachloropyrimidine | 1-(2'-chlorophenyl)-3-methyl-5-pyrazolone-5'-sulfonic acid | 2 | Reddish yellow. |
| 27 | 2.4.6-trichloro-5-ethylpyrimidine | 1-phenyl-3-methyl-5-pyrazolone-2'.5'-disulfonic acid | 2 | Do. |
| 28 | 2.4.6-tribromo-5-methylpyrimidine | do | 2 | Do. |
| 29 | 2-phenylamino-4.6-dichloro-1.3.5-triazine-4'-sulfonic acid | 1-hydroxynaphthalene-4-sulfonic acid | 4 | Red. |
| 30 | 2-ethylamino-4.6-dichloro-1.3.5-triazine-2'-sulfonic acid | 2-acetylamino-5-hydroxy-panhthalene-7-sulfonic acid | 5 | Red. |
| 31 | 2-carboxymethylamino-4.6-dichloro-1.3.5-triazine | | 4 | Red. |
| 32 | 2-amino-4.6-dichloro-1.3.5-triazine | 2-propionylamino-8-hydroxy-naphthalene-6-sulfonic acid | 5 | Red. |
| 33 | 2.4.6-tribromopyrimidine | 1-hydroxynaphthalene-3.6.8-trisulfonic acid | 2 | Red. |
| 34 | 2.4.6-trichloropyrimidine | 2-hydroxynaphthalene-3.6-disulfonic acid | 2 | Red. |
| 35 | 2.4.5.6-tetrabromo-pyrimidine | 1-hydroxynaphthalene-3.6.8-trisulfonic acid | 2 | Red. |
| 36 | 2.4.6-trichloro-5-carboxymethyl-pyrimidine | 1-hydroxynaphthalene-4.8-disulfonic acid | 2 | Red. |
| 37 | 5-carboxy-2,4.6-tribromopyrimidine | 1-(2'-chlorophenyl)-3-methyl-5-pyrazolone-4'-sulfonic acid | 2 | Reddish yellow. |
| 38 | 2-(2'-hydroxy-propylamino)-4.6-dichloro-1.3.5-traizine | do | 5 | Do. |
| 39 | do | 1-hydroxy-naphthalene-3.6-disulfonic acid | 5 | Red. |
| 40 | 2-amino-4.6-dibromo-1.3.5-triazine | do | 4 | Red. |
| 41 | 2-n-butylamino-4.6-dichloro-1.3.5-triazine | do | 5 | Red. |
| 42 | 2.4.5.6-tetrachloropyrimidine | do | 2 | Red. |
| 43 | 2-ethoxyethylamino-4.6-dichloro-1.3.5-triazine | 2-hydroxynaphthalene-4-sulfonic acid | 5 | Red. |
| 44 | 2-(4'-methylphenyl)-amino)-4.6-dichloro-1.3.5-triazine | 2-hydroxynaphthalene-3.6.8-trisulfonic acid | 5 | Red. |
| 45 | 2-benzylamino-4.6-dichloro-1.3.5-triazine | do | 5 | Red. |
| 46 | 2-amylamino-4.6-dichloro-1.3.5-triazine (amyl mixture) | do | 5 | Red. |
| 47 | 2-(2'-carboxyphenyl-amino)-4.6-dichloro-1.3.5-triazine | 2-hydroxynaphthalene-6-sulfonic acid | 7 | Red. |
| 48 | 2.4.6-trichloropyrimidine | do | 2 | Red. |
| 49 | 2-phenylamino-4.6-dichloro-1.3.5-triazine-2'.4'-disulfonic acid | do | 7 | Red. |
| 50 | do | 1-(2'.5'-dichlorophenyl)-3-methyl-5-pyrazolone-4'-sulfonic acid | 4 | Reddish yellow. |
| 51 | 2-naphthyl-2'-amino-4,6-dichloro-1.3.5-triazine-3'.6'-disulfonic acid | do | 5 | Do. |
| 52 | 2-naphthyl-1'-amino-4,6-dichloro-1.3.5-triazine-4'-sulfonic acid | 1-hydroxynaphthalene-4-sulfonic acid | 4 | Red. |
| 53 | 2.4.5.6-tetrachloro-pyrimidine | 1-hydroxynaphthalene-4.7-disulfonic acid | 2 | Red. |
| 54 | 2-methylamino-4.6-dichloro-1.3.5-triazine | do | 5 | Red. |
| 55 | 2-diethylamino-4.6-dichloro-1.3.5-triazine | 1-phenyl-3-carboxy-5-pyrazolone-3'-sulfonic acid | 5 | Orange. |
| 56 | 2-di-(3'-hydroxypropyl)-amino-4.6-dichloro-1.3.5-triazine | do | 5 | Do. |

| Example No. | R = Radical of (I) | B = Radical of (II) | (III)[1] | Shade of dyeing on cotton or wool (IV) |
|---|---|---|---|---|
| 57 | 2-N-methyl-N-ethyl-amino-4.6-dichloro-1.3.5-triazine-2'-sulfonic acid | 1-phenyl-3-methyl-5-pyrazolone-3'-sulfonic acid | 4 | Reddish yellow. |
| 58 | 2-naphthyl-1'-amino-4.6-dichloro-1.3.5-triazine-4'.8'-disulfonic acid | do | 4 | Do. |
| 59 | 2-methoxy-4.6-dichloro-1.3.5-triazine | do | 4 | Do. |
| 60 | do | 2-hydroxynaphthalene-3.6-disulfonic acid | 4 | Red. |
| 61 | 2-(4'-methylcyclo-hexylamino)-4.6-dichloro-1.3.5-triazine | 1-hydroxynaphthalene-3.6.8-trisulfonic acid | 5 | Red. |
| 62 | 2-(3'-chlorophenyl-amino)-4.6-dichloro-1.3.5-triazine | do | 7 | Red. |
| 63 | 2-N-ethyl-N-phenyl-amino-4.6-dichloro-1.3.5-triazine | do | 5 | Red. |
| 64 | 2-N-methyl-N-phenyl-amino-4.6-dichloro-1.3.5-triazine | 1-phenyl-3-methyl-5-pyrazolone-2'.5'-disulfonic aicd | 5 | Reddish yellow. |
| 65 | 2-naphthyl-2'-amino-4.6-dichloro-1.3.5-triazine-5'-sulfonic acid | do | 5 | Do. |
| 66 | 2-(4'-carboxyphenyl-amino)-4.6-dichloro-1.3.5-triazine | do | 5 | Do. |
| 67 | 2-(2'-carboxyethyl-amino)-4.6-dichloro-1.3.5-triazine | 1-hydroxy-8-benzoyl-aminonaphthalene-3.6-disulfonic acid | 4 | Red. |
| 68 | 2-ethoxy-4.6-dichloro-1.3.5-triazine | do | 4 | Red. |
| 69 | 2-amino-4.6-dichloro-1.3.5-triazine | do | 5 | Red. |
| 70 | 2.4.5.6-tetrachloro-pyrimidine | 1-hydroxy-8-acetylaminonaphthalene-5.7-disulfonic acid | 2 | Red. |
| 71 | do | 1-hydroxy-7-propionyl-aminonaphthalene-3.6-disulfonic acid | 2 | Red. |
| 72 | 5-carboxymethyl-2.4.6-trichloropyrimidine | do | 2 | Red. |
| 73 | 2-(2'-hydroxyethyl-amino)-4.6-dichloro-1.3.5-triazine | do | 5 | Red. |
| 74 | do | 1-(2'-methyl-6'-chlorophenyl)-3-methyl-5-pyrazolone-4'-sulfonic acid | 5 | Reddish yellow. |
| 75 | 2-phenylamino-4.6-dichloro-1.3.5-triazine-3'-sulfonic acid | do | 4 | Do. |
| 76 | 2.4.6-trichloropyrimidine | do | 1 | Do. |
| 77 | do | 1-hydroxy-8-propionylaminonaphthalene-3.5-disulfonic acid | 2 | Red. |
| 78 | 2-cyclohexylamino-4.6-dichloro-1.3.5-triazine | do | 5 | Red. |
| 79 | 2-(3'-hydroxybutylamino)-4.6-dichloro-1.3.5-triazine | 2-hydroxynaphthalene-7-sulfonic acid | 5 | Red. |
| 80 | 2-(3'-hydroxypropylamino)-4.6-dichloro-1.3.5-triazine | 1-hydroxy-7-acetylaminonaphthalene-3-sulfonic acid | 5 | Red. |
| 81 | 2-(3'-methoxypropylamino)-4.6-dichloro-1.3.5-triazine | do | 5 | Red. |
| 82 | 2.4.5.6-tetrachloropyrimidine | do | 2 | Red. |
| 83 | do | 1-hydroxy-8-benzoylaminonaphthalene-3.5-disulfonic acid | 2 | Red. |
| 84 | 2-naphthyl-2'-amino-4.6-dichloro-1.3.5-triazine-5'.7'-disulfonic acid | do | 4 | Red. |
| 85 | 2-methylamino-4.6-dibromo-1.3.5-triazine | do | 5 | Red. |
| 86 | 2-phenoxy-4.6-dichloro-1.3.5-triazine | 1-hydroxynaphthalene-4.6-disulfonic acid | 4 | Red. |
| 87 | do | 1-phenyl-3-methyl-5-pyrazolone-2'.5'-disulfonic acid | 4 | Reddish yellow. |
| 88 | 2-(2'-hydroxyethylamino)-4.6-dibromo-1.3.5-triazine | do | 5 | Do. |
| 89 | 2-ethylamino-4.6-dichloro-1.3.5-triazine | do | 5 | Do. |
| 90 | 2-n-propylamino-4.6-dichloro-1.3.5-triazine | 1-hydroxy-6-benzoylaminonaphthalene-3-sulfonic acid | 5 | Red. |
| 91 | 2-di-(2'-hydroxyethyl)-amino-4.6-dichloro-1.3.5-triazine | do | 4 | Red. |
| 92 | 2.4.5.6-tetrachloropyrimidine | do | 2 | Red. |
| 93 | do | 1-hydroxy-7-acetylaminonaphthalene-3.6-disulfonic acid | 2 | Red. |
| 94 | 2-N-2'-hydroxyethyl-N-phenylamino-4.6-dichloro-1.3.5-triazine | do | 5 | Red. |
| 95 | 2-naphthyl-1'-amino-4.6-dichloro-1.3.5-triazine-3'.6'-disulfonic acid | 1-hydroxy-6-butyrylaminonaphthalene-3-sulfonic acid | 7 | Red. |
| 96 | Cyanuric chloride | 1-hydroxy-8-butyrylaminonaphthalene-3.6-disulfonic acid | 6 | Red. |
| 97 | 2-dimethylamino-4.6-dichloro-1.3.5-triazine | 1-hydroxy-8-acetylaminonaphthalene-3.5-disulfonic acid | 5 | Red. |
| 98 | 2.4.5.6-tetrachloropyrimidine | do | 2 | Red. |
| 99 | 2-di-(2'-hydroxypropyl)-amino-4.6-dichloro-1.3.5-triazine | 2-hydroxynaphthalene-5-sulfonic acid | 5 | Red. |
| 100 | 2-n-butoxy-4.6-dichloro-1.3.5-triazine | 1-hydroxynaphthalene-4.6-disulfonic acid | 4 | Red. |
| 101 | 2.4.6-trichloropyrimidine | do | 1 | Red. |
| 102 | 2-phenylamino-4.6-dibromo-1.3.5-triazine-3'-sulfonic acid | do | 4 | Red. |
| 103 | 5-carboxymethyl-2.4.6-tribromopyrimidine | do | 2 | Red. |
| 104 | 2-(4'-methoxybutylamino)-4.6-dichloro-1.3.5-triazine | do | 5 | Red. |
| 105 | 2-phenylamino-4.6-dichloro-1.3.5-triazine-2'.5'-disulfonic acid | 1-hydroxynaphthalene-4-sulfonic acid | 5 | Red. |
| 106 | do | 1-phenyl-3-methyl-5-pyrazolone-4'-sulfonic acid | 4 | Reddish yellow. |
| 107 | 2-N-methyl-N-carboxymethylamino-4.6-dichloro-1.3.5-triazine | do | 5 | Do. |
| 108 | 2-(4'-carboxyphenyl-amino)-4.6-dichloro-1.3.5-triazine | do | 5 | Do. |
| 109 | do | 1-hydroxynaphthalene-5-sulfonic acid | 5 | Red. |
| 110 | 2-(2'-methoxyphenyl-amino)-4.6-dichloro-1.3.5-triazine | 2-hydroxynaphthalene-3.6-disulfonic acid | 5 | Red. |
| 111 | 2-n-propoxy-4.6-dichloro-1.3.5-triazine | do | 4 | Red. |
| 112 | 2-naphthyl-1'-amino-4.6-dichloro-1.3.5-triazine-6'.7'-sulfonic acid | 2-hydroxynaphthalene-8-sulfonic acid | 5 | Red. |
| 113 | 2-naphthyl-2'-amino-4.6-dichloro-1.3.5-triazine-6'-sulfonic acid | 1-phenyl-3-carboxy-5-pyrazolone-4'-sulfonic acid | 5 | Orange. |
| 114 | 2.4.5.6-tetrachloro-pyrimidine | do | 2 | Do. |
| 115 | 2-naphthyl-2'-amino-4.6-dichloro-1.3.5-triazine-4'.8'-disulfonic acid | 1-hydroxynaphthalene-4-sulfonic acid | 4 | Red. |
| 116 | 2-naphthyl-2'-amino-4.6-dichloro-1.3.5-triazine-5'.7'-disulfonic acid | do | 7 | Red. |
| 117 | 2-phenylamino-4.6-dichloro-1.3.5-triazine-2'.4'-disulfonic acid | do | 5 | Red. |
| 118 | do | 1-hydroxy-7-benzoylaminonaphthalene-3-sulfonic acid | 4 | Red. |
| 119 | Cyanuric chloride | 1-hydroxynaphthalene-4.7-disulfonic acid | 6 | Red. |

[1] (III) = Method of production according to example.

EXAMPLE 120

90 parts of the dyestuff (Mol. wt. 898 as the tetra sodium salt)—obtained by coupling 2-diazo-6-(2'.6'-dichloropyrimidyl-4'-amino)naphthalene-4.8-disulfonic acid with 1 - phenyl - 3 - methyl - 5 - pyrazolone-2'.4'-disulfonic acid—are dissolved in 1500 parts of water and to this solution a solution of 27 parts of crystallized copper sulfate and 28 parts of crystallized sodium acetate in 200 parts of water is added. 80 parts of 10% hydrogen peroxide solution are then added dropwise in 60 minutes at a temperature of 30–35°. The pH-value is maintained at 4.8–5.2 by dropwise addition of a 25% ammonia solution. The color of the solution changes from yellow to red. On stirring for further 30 minutes the yellow dyestuff disappears and coppering is complete. The copper complex dyestuff formed is precipitated with sodium chloride, filtered off and dried. A red powder is obtained which dissolves in water with a red coloration. When a spun rayon fabric is printed with this dyestuff according to the method described in Example 2, a red print of good light and wet fastness is obtained. Dyestuffs with similar properties were obtained by replacing 1-phenyl-3-methyl-5-pyrazolone-2'.4'-disulfonic acid by one of the following coupling components:

| Example No. | Coupling component | Shade of the dyeing on cotton |
|---|---|---|
| 121 | 1-phenyl-3-methyl-5-pyrazolone-2'.5'-disulfonic acid | Red. |
| 122 | 1-phenyl-3-methyl-5-pyrazolone-4'-sulfonic acid | Red. |
| 123 | 1-hydroxynaphthalene-3.6.8-trisulfonic acid | Blue. |
| 124 | 2-hydroxynaphthalene-3.6.8-trisulfonic acid | Reddish blue. |
| 125 | 2-hydroxynaphthalene-5.8-disulfonic acid | Do. |
| 126 | 2-hydroxynaphthalene-5.7-disulfonic acid | Do. |
| 127 | 1-hydroxynaphthalene-3.6-disulfonic acid | Blue. |
| 128 | 1-hydroxy-8-acetylaminonaphthalene-3.6-disulfonic acid | Do. |

EXAMPLE 129

31.8 parts of 2.6-diaminonaphthalene-4.8-disulfonic acid are dissolved in 300 parts of water with the addition of 30 parts of 30% sodium hydroxide solution. 23 parts of 2.4.5,6-tetrachloropyrimidine dissolved in 100 parts of acetone are added with good stirring, and the mass stirred under reflux for 20 hours at a temperature of 50°. At the same time the pH value of the solution is maintained at 4.5–5.5 by the dropwise addition of dilute sodium carbonate solution. The reaction product thus formed gradually precipitates in crystalline form. After approximately 90% of the diamino compound has reacted, the mass is made alkaline by the addition of about 60 parts of 20% sodium carbonate solution to give an alkaline reaction on Brilliant Yellow indicator paper, upon which the greater part of the precipitate goes into solution. The solution is filtered free from the insoluble residue and the filter is washed with water. The reaction product is precipitated from the filtrate by the addition of sodium chloride, filtered off and stirred into 300 parts of water at 0°. 40 parts of 30% hydrochloric acid are added to give a strongly acid reaction on Congo Red indicator paper. Then a solution of about 5.5 parts of sodium nitrite in 20 parts of water is added dropwise to the suspension at 0–5°. To the resulting suspension of the diazo compound is added an ice-cold alkaline solution of 33 parts of 1-hydroxynaphthalene-3.6.8-trisulfonic acid and 50 parts of sodium carbonate in 300 parts of water. The red monoazo dyestuff formed is precipitated with common salt and filtered off.

An amount of the filter cake equivalent to 90 parts of 100% free acid monoazo dyestuff (mol. wt. 894) is dissolved in water and the oxidizing-coppering process is carried out as described in Example 120. After precipitation and drying a dark powder is obtained which dissolves in water with a blue coloration.

A cotton fabric is impregnated with a solution containing 8 parts of the above dyestuff,
20 parts of urea,
2 parts of sodium carbonate, and
100 parts of water pressed between squeeze rollers so that it contains 70% of its weight of liquor, and dried. It is then treated for 4–5 minutes in dry heat at 150°, rinsed in cold and warm water, soaped at the boil for 15 minutes with a 0.2% solution of a non-ionic detergent and rinsed. A navy blue dyeing is obtained which is fixed so stably as to be fast to soda boiling and to the other wet treatments.

For the Vigoureux or melange printing of wool a paste of the following composition is used:

Parts of the dyestuff obtained according to the particulars given above _____ 60
Parts of urea _____ 200
Parts of water _____ 535
Parts of 3% sodium alginate thickening _____ 200
Parts of a highly sulfonated castor oil _____ 5

Parts total _____ 1000

The printed slubbing is steamed for two 45-minute periods with intermediate cooling. It is then rinsed with hot and with cold water and dried. The obtained navy blue print is fast to light and to wet treatments.

For printing cotton the following procedure is suitable: Mercerized cotton sateen is printed with a paste of the following composition:

Parts of the above dyestuff _____ 50
Parts of urea _____ 100
Parts of water _____ 375
Parts of a 3% sodium alginate thickening _____ 450
Parts sodium 3-nitrobenzene-1-sulfonate _____ 10
Parts calcined sodium carbonate _____ 15

Parts total _____ 1000

The print is dried, steamed for 10 minutes at 102°, rinsed in cold and in warm water, soaped at the boil, rinsed again and dried. It is of a navy blue shade possessing excellent light and wet fastness.

The dyestuff can also be fixed on the fiber by treatment in dry heat for about 5 minutes at 140–150° or for about 1 minute at 200°.

Since the dyestuff is practically non substantive and well soluble in water, the non fixed portion can also be removed in the following manner:

The fixed print is washed for 5 minutes in cold water at a goods-to-liquor ratio of 1:40, then put into a new cold water bath (goods-to-liquor ratio 1:40) which is heated to 100° in the course of 5 minutes and held at 100° for 5 minutes. The washed print is withdrawn, rinsed with running tap water and dried. The navy blue print is fast to light and to wet treatments and the unprinted area is perfectly white.

EXAMPLE 130

76.3 parts of the monoazo dyestuff (mol. wt. 763 as the tetra sodium salt)—obtained by alkaline coupling of diazotized 2 - amino-6 - acetylaminonaphthalene - 4.8-disulfonic acid with 1-hydroxynaphthalene - 3.6 - disulfonic acid—is simultaneously oxidized and coppered according to the method described in Example 120. The dyestuff obtained is stirred into 700 parts of a 5% sodium hydroxide solution and maintained at 80–90° until saponification of the acetylamino group is complete. The solution is then neutralized with about 80 parts of 30% hydrochloric acid and allowed to cool. The copper-complex dyestuff is completely precipitated with sodium chloride, filtered off and washed with sodium chloride solution. The moist filter cake is stirred into 800 parts of hot water, and solved at a pH value of 5–6, then 20 parts of 2.4.5.6-tetrachloropyrimidine are added and the temperature maintained at 70° with stirring until no further free amino group is indicated. The reaction mixture is kept at a constant pH value of 5.5 during this time by the dropwise addition of dilute sodium carbonate solution. On completion of condensation the dyestuff is precipitated with sodium chloride and then filtered off. The dried and ground dyestuff is a dark powder which dissolves in water with a blue coloration.

Cotton is dyed according to the method described in Example 1. A reddish-blue dyeing is obtained, which is fixed so stably so as to be fast to soda boiling and to the other wet treatments.

EXAMPLE 131

80 parts of the aminomonoazo dyestuff (as the tetrasodium salt)—obtained by alkaline coupling of diazotized 2 - amino - 6 - acetylaminonaphthalene - 4.8 - disulfonic acid with 1 - hydroxynaphthalene - 3.6.8 - trisulfonic acid and subsequent caustic-alkaline saponification—are dissolved in 800 parts of water and the pH value is adjusted to 6–7 by means of sodium carbonate. In 2 hours the solution is added to an ice-cold suspension of 20 parts of cyanuric chloride in 100 parts of water. The pH value is maintained at 4–5 by the addition of 20% sodium carbonate solution. The suspension is stirred at 0° until no further aminoazo dyestuff is present, heated to 20°, and oxidizing-coppering then carried out by the method described in Example 120. After precipitation and drying a dark powder is obtained, which dissolves in water with a blue coloration.

The dyestuff is applied to a cotton fabric by the method described in Example 3 to give a blue dyeing fast to boiling.

An alternative padding method is as follows: 100 parts of a fabric of viscose staple fiber are padded at room temperature with an aqueous neutral solution of 50 g./l. of the above dyestuff, squeezed to about 180% of its original dry weight and dried. The dyeing is then developed and fixed by treatment for about 90 minutes in a bath at 40–50° (goods-to-liquor ratio 1:50) containing 250 g./l. of calcined sodium sulfate, 2 g./l. of sodium 3-nitrobenzene-1-sulfonate and 10 g./l. of sodium bicarbonate. It is then rinsed in cold and in hot water, soaped at the boil for 10 minutes in a 0.3% soap solution in distilled water, rinsed again and dried. The obtained navy blue dyeing is fast to light and to wet treatments.

For printing cotton the following procedure is suitable: Cotton cretonne is printed with a paste of the composition:

| | |
|---|---|
| Parts of the above dyestuff | 50 |
| Parts of urea | 100 |
| Parts of sodium 3-nitrobenzene-1-sulfonate | 10 |
| Parts of sodium bicarbonate | 15 |
| Parts of a 3% sodium alginate thickening | 450 |
| Parts of water | 375 |
| Parts total | 1000 |

The print is dried at 50°, fixed by steaming for 10 minutes at 102° and finished as described in the last paragraph of Example 129. The obtained navy blue print is fast to light and to wet treatments and the unprinted area is perfectly white.

EXAMPLE 132

The dyestuff solution obtained by the procedure given in Example 131 is heated to 40° immediately after the condensation with cyanuric chloride, and then 10 parts of aminobenzene are added. The mixture is stirred for 4 hours, while a constant pH value of about 7 is maintained by the addition of 20% sodium carbonate solution. On completion of the second condensation the oxidizing-coppering treatment is carried out according to the method described in Example 120. After precipitation and drying a dark powder is obtained which dissolves in water with a blue coloration. A cotton fabric is dyed according to the procedure given in Example 7. A blue dyeing is obtained, which is fixed so stably as to be fast to soda boiling and to the other wet treatments.

EXAMPLE 133

72.1 parts of the monoazo dyestuff sodium 1 - hydroxy - 2 - (6' - aminonaphthyl - 2' - azo) - naphthalene-3.6.4'.8' - trisulfonate—obtained from 2- diazo - 6-nitronaphthalene - 4.8 - disulfonic acid and 1 - hydroxynaphthalene-3.6-disulfonic acid according to the procedure described in Example 3—are dissolved in 900 parts of water at 40° and the pH value is adjusted to 5. 34.3 parts of sodium 2 - phenylamino - 4.6 - dichloro - 1.3.5-triazine-3'-sulfonate in the form of a concentrated aqueous solution are added; the temperature is maintained at 40–45 and the pH-value at 5–6, a sodium carbonate solution being dropped in for neutralizing the acid formed during the reaction. On completion of the condensation the dyestuff is salted out with sodium chloride, filtered off, brought again into solution and simultaneously oxidized and coppered at 35° by means of copper sulfate and hydrogen peroxide in the presence of sodium acetate as buffer for maintaining a pH-value of 5–5.5 throughout the reaction. The dyestuff is isolated by salting out and filtering, dried and ground, it is then a dark powder soluble in water with a dark blue coloration.

Pad Batch dyeing process: Mercerized cotton sateen is impregnated at 25° with a padding liquor containing per liter:

50 grams of the above dyestuff
150 grams of calcined sodium sulfate
30 grams of sodium metasilicate
20 grams of a 30% sodium hydroxide solution.

The impregnated material is squeezed so that the pick-up of liquor is about 75% of the dry weight, wrapped in a sheet of plastic (e.g. polyethylene) and stored for about 24 hours at 25°. It is then rinsed with cold and with warm water, soaped at the boil for 15 minutes with a solution containing 0.5 gram of a carboxy methylated or sulfated alkylpolyglycol ether and 0.5 gram of sodium carbonate per liter, rinsed again and dried. The obtained navy blue dyeing is fast to light and to wet treatments.

In the following table are listed further copper complex dyestuffs which were obtained by the oxidizing-coppering treatment of metal-free dyestuffs disclosed in the foregoing Examples 1 to 119. The method employed was that described in Example 120. In the table the dyestuffs are characterized by the example number of the metal-free dyestuffs and by the shade of the dyeing on cotton.

| Example No. | Oxidized-coppered dyestuff of Example (I) | Shade of dyeing on cotton (II) |
|---|---|---|
| 134 | 2 | Red. |
| 135 | 3 | Red. |
| 136 | 8 | Red. |
| 137 | 9 | Red. |
| 138 | 10 | Red. |
| 139 | 11 | Red. |
| 140 | 13 | Blue. |
| 141 | 14 | Do. |
| 142 | 15 | Do. |
| 143 | 16 | Do. |
| 144 | 17 | Do. |
| 145 | 19 | Red. |
| 146 | 20 | Red. |
| 147 | 21 | Red. |
| 148 | 22 | Blue. |
| 149 | 25 | Do. |
| 150 | 29 | Do. |
| 151 | 30 | Do. |
| 152 | 31 | Do. |
| 153 | 33 | Do. |
| 154 | 34 | Do. |
| 155 | 35 | Do. |
| 156 | 36 | Blue. |
| 157 | 39 | Do. |
| 158 | 40 | Do. |
| 159 | 44 | Do. |
| 160 | 45 | Do. |
| 161 | 46 | Do. |
| 162 | 47 | Do. |
| 163 | 49 | Do. |
| 164 | 50 | Red. |

| Example | Oxidized-coppered dyestuff of Example (I) | Shade of dyeing on cotton (II) |
|---|---|---|
| 165 | 52 | Blue. |
| 166 | 53 | Do. |
| 167 | 54 | Do. |
| 168 | 57 | Red. |
| 169 | 58 | Red. |
| 170 | 60 | Blue. |
| 171 | 61 | Do. |
| 172 | 62 | Do. |
| 173 | 63 | Do. |
| 174 | 64 | Red. |
| 175 | 66 | Red. |
| 176 | 67 | Blue. |
| 177 | 70 | Do. |
| 178 | 71 | Do. |
| 179 | 72 | Do. |
| 180 | 73 | Do. |
| 181 | 74 | Do. |
| 182 | 77 | Do. |
| 183 | 78 | Do. |
| 184 | 84 | Do. |
| 185 | 86 | Do. |
| 186 | 87 | Red. |
| 187 | 88 | Red. |
| 188 | 89 | Red. |
| 189 | 93 | Blue. |
| 190 | 95 | Do. |
| 191 | 96 | Do. |
| 192 | 97 | Do. |
| 193 | 98 | Do. |
| 194 | 100 | Do. |
| 195 | 101 | Do. |
| 196 | 102 | Do. |
| 197 | 104 | Do. |
| 198 | 105 | Do. |
| 199 | 106 | Red. |
| 200 | 107 | Red. |
| 201 | 110 | Blue. |
| 202 | 111 | Do. |
| 203 | 112 | Do. |
| 204 | 115 | Do. |
| 205 | 116 | Do. |
| 206 | 117 | Do. |
| 207 | 118 | Do. |
| 208 | 119 | Do. |

The following table contains some copper complex dyestuffs of the formula

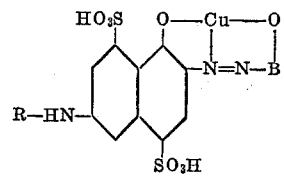

which were obtained according to the details given in Examples 129 and 133 and are characterized by the reactive component from which R is derived (Column I), by the coupling component from which

is derived (Column II), by the method of preparation used (according to the example mentioned in Column III) and by the shade of the dyeing on cotton (Column IV)

In Examples 211, 214, 216, 219 and 220 the final condensation with the reactive components mentioned in Column (I) was carried out under the same conditions as described in Example 133.

In Example 212 the cyanuric bromide was condensed with the copper-containing aminomonoazo dyestuff in the same manner as described in Example 131.

| Example No. | R = Radical of (I) | $\overset{-O}{\underset{-B}{|}}$ = Radical of (II) | (III)[1] | Shade of dyeing on cotton (IV) |
|---|---|---|---|---|
| 209 | 2.4.5.6-tetrachloropyrimidine | 1-hydroxy-8-acetylaminonaphthalene-3.6-disulfonic acid | 130 | Blue. |
| 210 | 2-amino-4.6-dichloro-1.3.5-triazine | do | 133 | Do. |
| 211 | do | 1-hydroxynaphthalene-3.6.8-trisulfonic acid | 130 | Do. |
| 212 | Cyanuric bromide | do | 130 | Do. |
| 213 | 2.4.5.6-tetrachloropyrimidine | 2-hydroxynaphthalene-3.6.8-trisulfonic acid | 130 | Do. |
| 214 | 2-methoxy-4.6-dichloro-1.3.5-triazine | 1-hydroxy-8-acetylaminonaphthalene-3.5-disulfonic acid | 130 | Do. |
| 215 | do | 1-hydroxynaphthalene-4.6-disulfonic acid | 133 | Do. |
| 216 | 2-(2'-hydroxyethylamino)-4.6-dichloro-1.3.5-triazine | do | 130 | Do. |
| 217 | do | 2-hydroxynaphthalene-3.6-disulfonic acid | 132 | Do. |
| 218 | 2.4.6-trichloropyrimidine | do | 130 | Do. |
| 219 | 2-amino-4.6-dichloro-1.3.5-triazine | do | 130 | Do. |
| 220 | 2-methylamino-4.6-dichloro-1.3.5-triazine | do | 130 | Do. |

[1] (III) = Method according to.

Formulae of representative dyes of the foregoing examples are as follows:

EXAMPLE 1

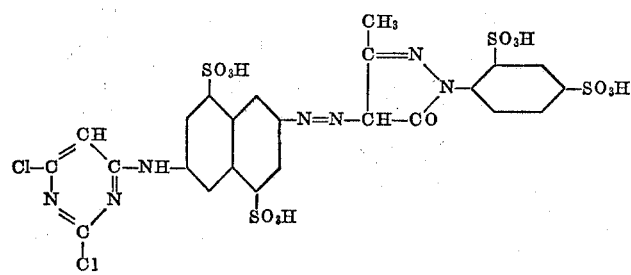

EXAMPLE 2
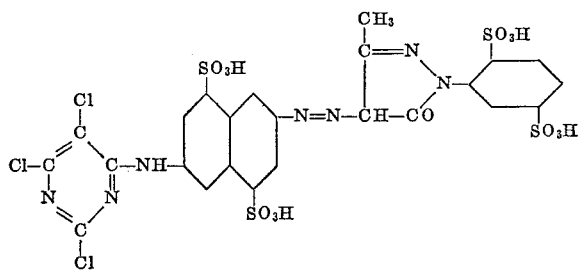
EXAMPLE 3
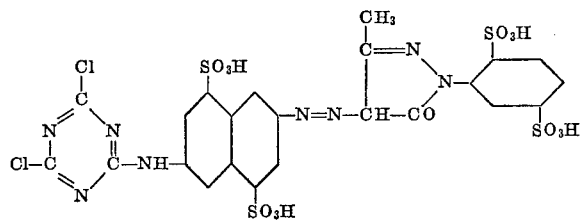
EXAMPLE 4
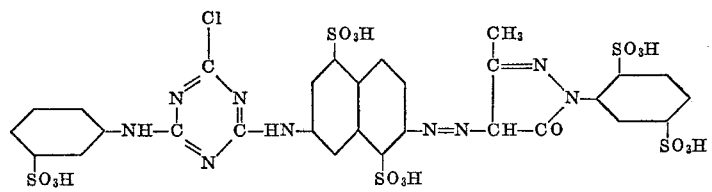
EXAMPLE 5 (first paragraph)
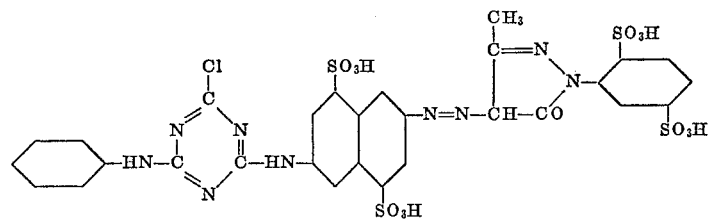
EXAMPLE 5 (second paragraph)
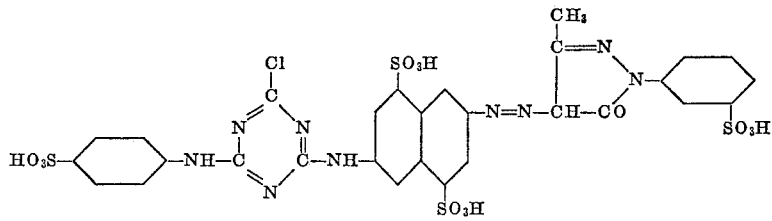
EXAMPLE 18
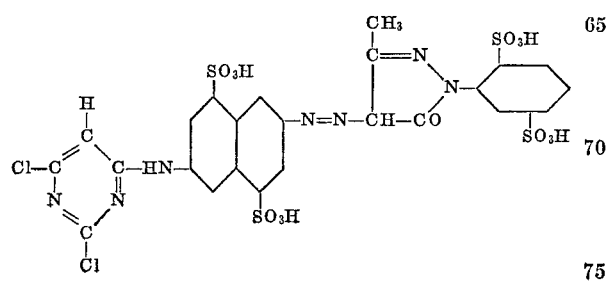
EXAMPLE 26
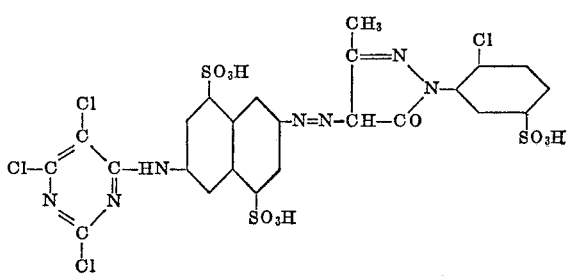

EXAMPLE 120

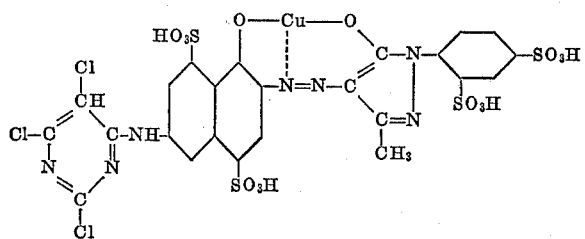

EXAMPLE 129

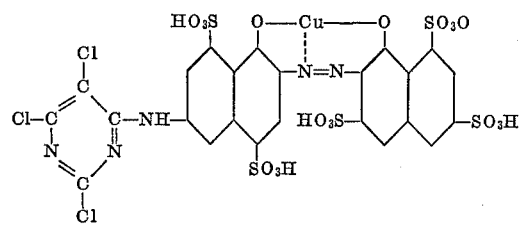

EXAMPLE 130

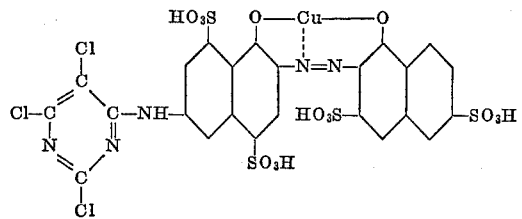

EXAMPLE 131

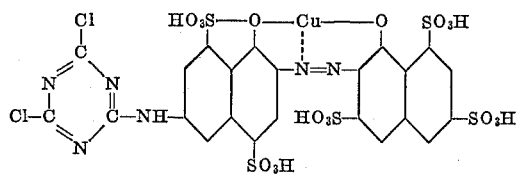

EXAMPLE 132

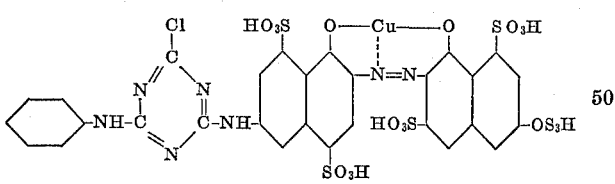

EXAMPLE 133

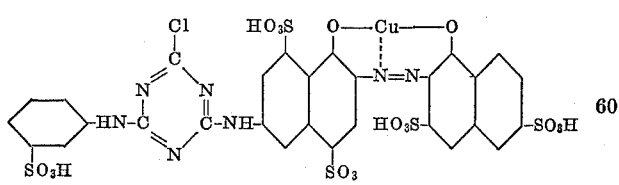

EXAMPLE 142

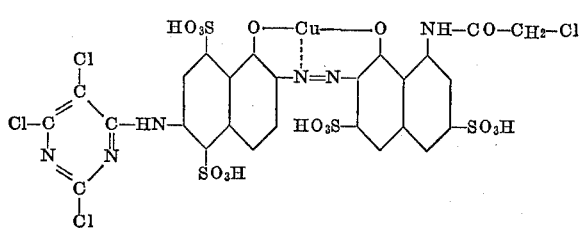

EXAMPLE 143

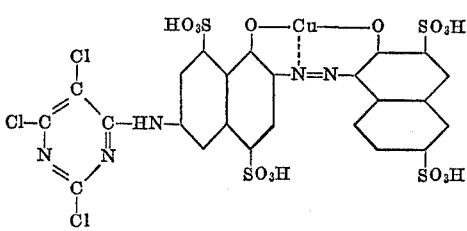

EXAMPLE 9

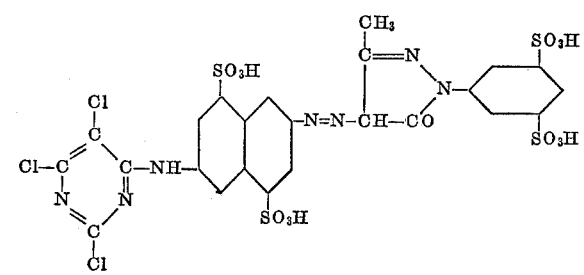

Having thus disclosed the invention what I claim is:

1. A monoazo dyestuff of the formula

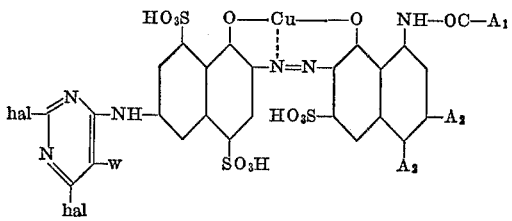

wherein
$w$ is H, Cl, Br, $CH_3$, $C_2H_5$, COOH or $-CH_2-COOH$,
$A_1$ is chloromethyl, lower alkyl or phenyl,
one $A_2$ is H, the other $A_2$ is $-SO_3H$ and
hal is Cl or Br.

2. The monoazo dyestuff of the formula

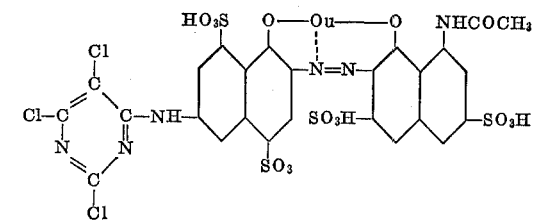

3. The monoazo dyestuff of the formula

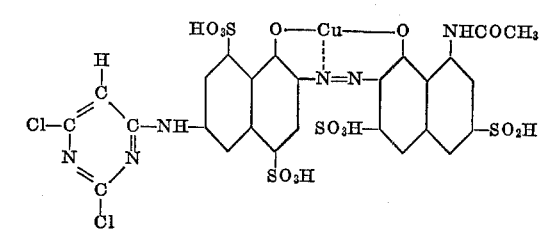

4. The monoazo dyestuff of the formula

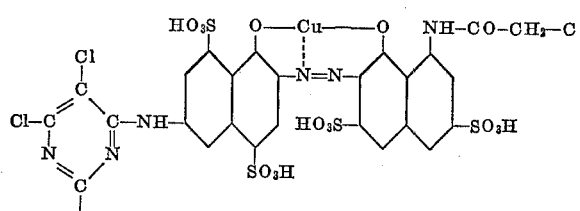

(References on following page)

References Cited

UNITED STATES PATENTS

| | | | |
|---|---|---|---|
| 2,951,071 | 8/1960 | Tilley | 260—153 |
| 3,157,630 | 11/1964 | Stephen et al. | 260—146 |
| 3,268,505 | 8/1966 | Schundehutte et al. | 260—146 |
| 3,288,777 | 11/1966 | Benz et al. | 260—146 |
| 2,919,269 | 12/1959 | Nickel et al. | 260—153 XR |
| 2,943,085 | 6/1960 | Oesterlein | 260—146 |

FOREIGN PATENTS

| | | |
|---|---|---|
| 1,221,621 | 1/1960 | France. |
| 1,246,743 | 10/1960 | France. |
| 1,241,551 | 8/1960 | France. |
| 1,225,281 | 2/1960 | France. |

FLOYD D. HIGEL, Primary Examiner

U.S. Cl. X.R.

8—13, 41, 42, 43, 50, 51, 71; 260—154, 147, 153, 510, 256.4, 256.5, 249.5, 507